Sept. 28, 1965   R. F. GEIGER   3,208,563
ARRANGEMENT FOR MOUNTING COMPONENTS
Filed May 12, 1960   3 Sheets-Sheet 1
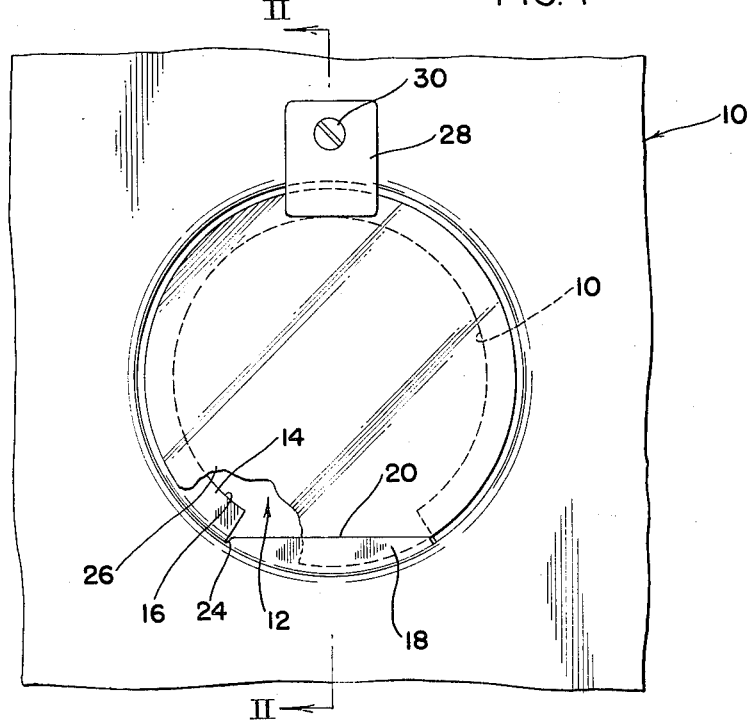
FIG. 1
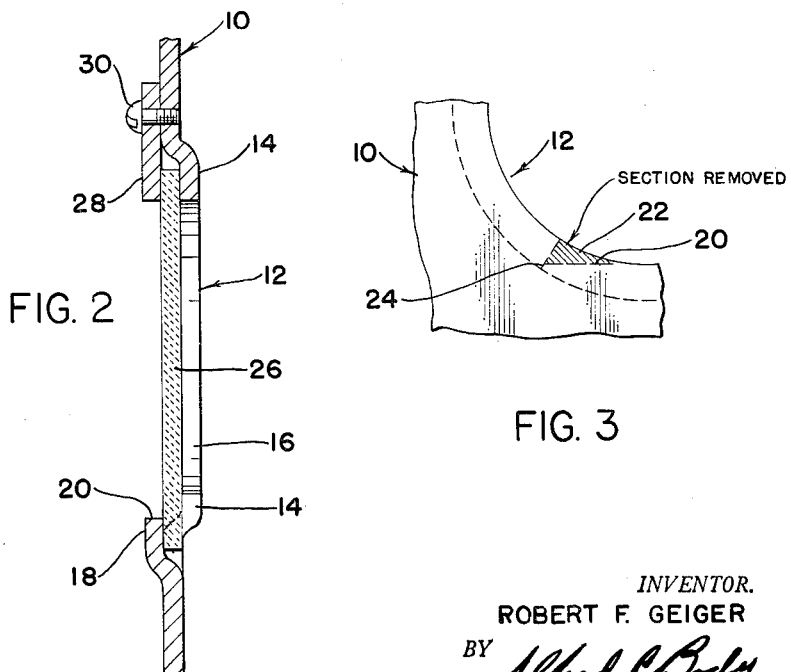
FIG. 2
FIG. 3
INVENTOR.
ROBERT F. GEIGER
BY
*Alfred C. Body*
ATTORNEY Sept. 28, 1965          R. F. GEIGER          3,208,563
ARRANGEMENT FOR MOUNTING COMPONENTS
Filed May 12, 1960                  3 Sheets-Sheet 2

INVENTOR
ROBERT F. GEIGER
BY *Alfred C. Body*
ATTORNEY

Sept. 28, 1965 R. F. GEIGER 3,208,563
ARRANGEMENT FOR MOUNTING COMPONENTS
Filed May 12, 1960 3 Sheets-Sheet 3
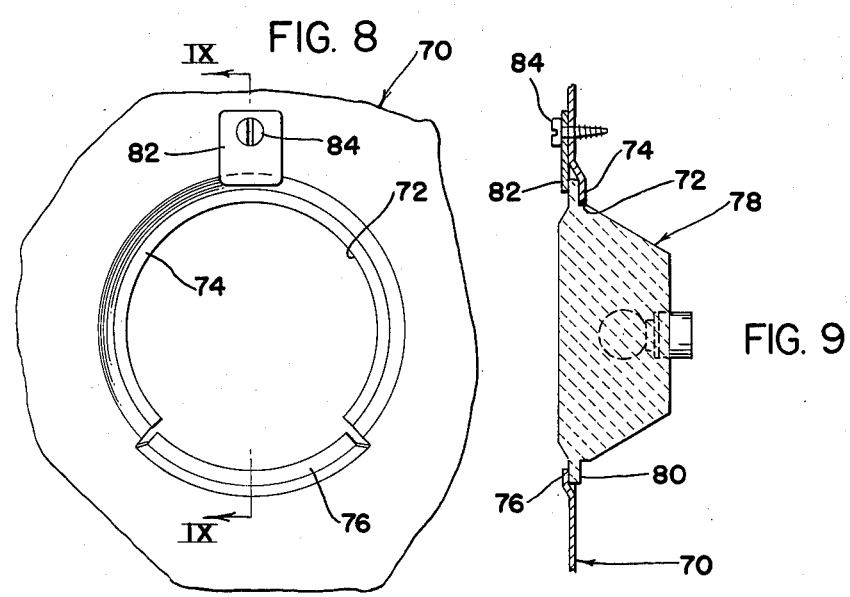
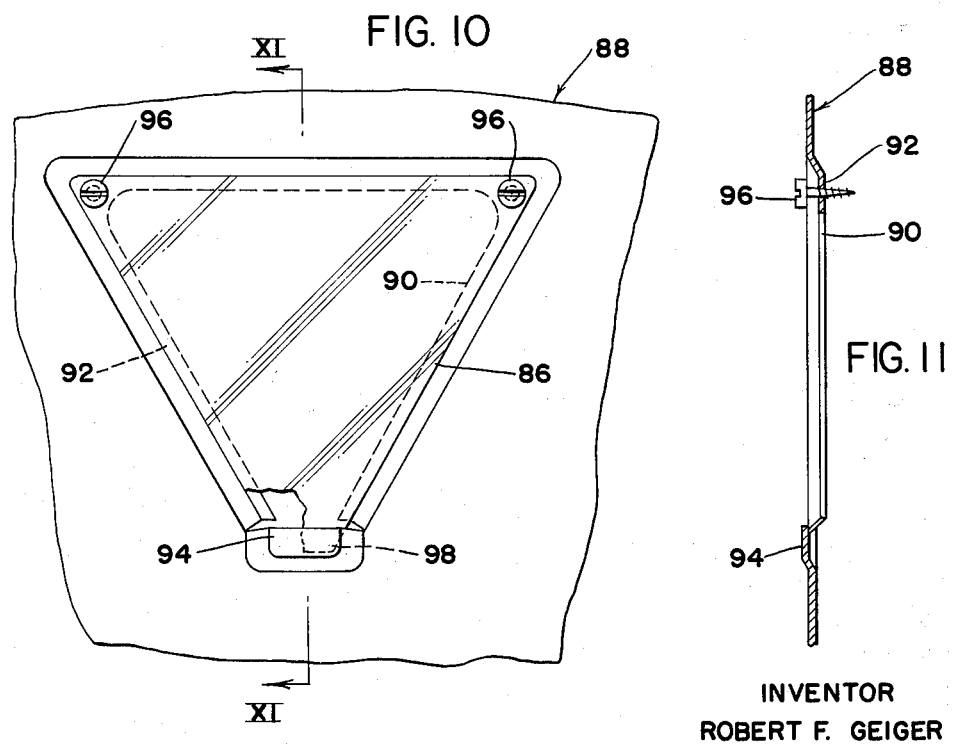
INVENTOR
ROBERT F. GEIGER
BY Alfred C. Body
ATTORNEY

United States Patent Office 3,208,563
Patented Sept. 28, 1965

3,208,563
ARRANGEMENT FOR MOUNTING
COMPONENTS
Robert F. Geiger, Buffalo, N.Y., assignor to Twin Industries Corporation, a corporation of Delaware
Filed May 12, 1960, Ser. No. 28,640
1 Claim. (Cl. 189—64)

This invention relates to a novel arrangement for mounting a component on a supporting structure in such a manner that the assembly consists of a minimum number of details and has a minimum projection from the face of the supporting structure as well as a minimum overall thickness.

Although not limited thereto, the invention is particularly applicable to the mounting of various components such as access doors, light and instrument assemblies, or reflectors in openings provided in metallic sheet material, whether flat, contoured or bent into the form of a corner. Thus, the invention is particularly applicable to the mounting of various components of the type referred in openings on the sheet metal panels or members of land vehicles or aircraft where it is necessary or desirable to mount a component without projecting its thickness appreciably beyond one or the other surface of the mounting panel.

Heretofore in the art of mounting a component in an opening provided in a larger member, it has been more or less conventional to provide a flange around the periphery of the member or the opening and to secure the component to the member by a plurality of screws or other fastening members which extend through the flange. Alternatively, a second flange is provided on the side of the member opposite the flange on the component, the arrangement being such that the flanges may be drawn together in one manner or another to secure the component within the opening. Both of these methods, while workable, require a relatively large number of parts and usually result in a portion of the component projecting from both sides of the member on which it is mounted. Thus, these mountings are oftentimes unsatisfactory where, for example, an assembly is required of utmost simplicity which lends itself to easy repair or replacement, where it is desired to provide an instrument panel in which the instruments do not project appreciably beyond one surface of the panel, or where a cowling is required having access doors or reflectors thereon which do not project from its surface.

Accordingly, it is an object of this invention to provide an arrangement for mounting components on panels and other members, whether curved, bent or flat, which overcomes the aforementioned difficulties and other of conventional mountings.

Another object of the invention is to provide an arrangement for mounting components in which the major portion of the mounting is an integral part of the larger member on which the component is mounted, thereby minimizing the number of removable parts required.

A further object of the invention is to provide a component mounting arrangement in which the component will not project appreciably from one or the other face of the member on which it is mounted and in which access to removal of the component may be had from one side of the member.

Still another object of the invention is to provide a component mounting which is simplified to the extent that its repair and replacement require the simplest of tools.

In accordance with the invention, the foregoing objects are accomplished by a novel construction in which a supporting member such as a sheet metal article, for example, has an opening provided therein for the reception of an assembly to be mounted. Offset to one side of the supporting member, and integral therewith, is a flange which extends part way around the periphery of the aforesaid opening; and, in a similar manner, the other side of the supporting member is provided with an integral offset flange which extends around at least a part of the remaining portion of the periphery of the opening. In the case where the supporting member is sheet metal, these flanges may be provided by a punching or forming operation. In any event, after the flanges are formed, a removable assembly may then be snugly engaged between the oppositely offset flanges, with a surface of the assembly extending substantially co-planar with the surface of the member on which it is mounted, if desired. To retain the assembly in position, a simple fastening member is provided for engaging an edge of the assembly opposite one of the aforesaid flanges. In this manner, a minimum number of removable parts are required since the main retaining flanges are an integral part of the supporting member for the assembly, and a minimum thickness, equal to that of one of the aforesaid flanges, need project beyond one or the other face of the supporting member.

The foregoing and other objects and features of the invention will become apparent from the following detailed description taken in connection with the accompanying drawings which form a part of this specification and in which:

FIGURE 1 is an elevational view of one embodiment of the invention particularly adapted for use in mounting a closure plate or a reflector in an opening provided in a flat sheet metal member;

FIGURE 2 is a cross-sectional view taken along line II—II of FIGURE 1;

FIGURE 3 is an enlarged fragmentary elevational view which indicates the manner in which the access opening of FIGURE 1 is formed;

FIGURE 8 is an elevational view of still another embodiment of the invention adapted for mounting an instrument or lighting fixture on a sheet metal member;

FIGURE 9 is a cross-sectional view taken along line IX—IX of FIGURE 8;

FIGURE 10 is an illustration of an embodiment of the invention adapted for mounting triangular reflectors or access covers over openings provided in sheet metal members; and FIGURE 11 is a cross-sectional view taken along line XI—XI of FIGURE 10.

Figure 4:
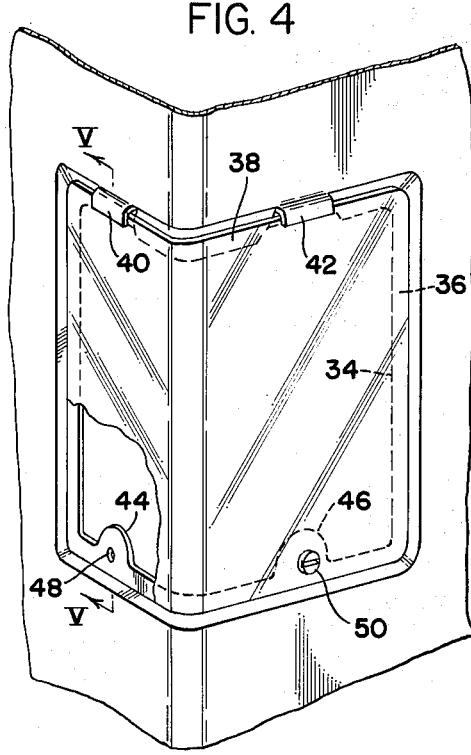
FIGURE 4 is an illustration of another embodiment of the invention adapted for mounting a bent closure plate or a reflector on the corner of a sheet metal member.

Referring to FIGURES 1 and 2, the member in which the access opening is formed is designated generally by the reference numeral 10. As best shown in FIGURE 2, the member 10 is of flat, planar configuration in the vicinity of the opening and may, for example, comprise a sheet metal cowling or the like.

While the opening 12 may be of any desired shape, in the illustrated embodiment it is circular in outline throughout most of its extent. As shown in FIGURE 2, the flat sheet material of member 10 is offset to the right to present a flange 14 which, in the particular embodiment illustrated, extends slightly more than three-fourths of the way around the access opening 12. This flange 14 defines an arcuate edge 16 for the opening, which edge is approximately three-fourths of a circle. From FIGURE 2, it will be noted that the flange 14 is offset to one side of the flat member 10 by an amount substantially equal to the thickness of the panel.

A second flange 18 is formed by deforming the sheet material of the member 10 immediately adjacent the opening 12 to the opposite side of the member. This flange 18 defines the remainder of the edge of the access opening 12, and in the illustrated embodiment, presents a flat edge 20 which extends tangent to an imaginary projection of the arcuate edge 16 of the other offset flange 14. From FIGURE 2, it will be apparent that the flange 18 is also offset to the opposite side of the plane of the member 10 by an amount equal to the thickness of the member.

The access opening and the flanges 14 and 18 may be formed as follows: Referring to FIGURE 3, a circular opening 12 is first formed in the initially flat, planar member 10. Following this, a pair of approximately triangular sections 22 (shaded in FIGURE 3) are cut away at the edge of the circular opening to form the flat edge 20 which is tangent to the circle. At the inner apex of these removed sections 22, slits 24 are cut to a suitable depth radially outward from the circle. Thereafter, by a suitable stamping operation, the respective oppositely offset flanges 14 and 18 are formed separately, these flanges being separated from each other by the slits 24. It is to be understood, of course, that this particular procedure for forming the access opening and the offset flanges is given only as illustrative of one particular embodiment, it being understood that various other techniques for forming the access opening and oppositely offset flanges may be used without departing from the spirit and scope of this invention.

The closure for the access opening is in the form of a flat plate or reflector 26 having a thickness equal to that of the member 10 for the illustration given. As shown in FIGURE 2, element 26 is engaged snugly between the oppositely offset flanges 14 and 18. The element 26 has a diameter larger than that of the opening 12, but slightly smaller than the space bounded by the connections of the flanges 14 and 18 to the member 10. It will be noted that since the element 26 has a thickness equal to that of member 10, its opposite surfaces are substantially, if not exactly, co-planar with those of the member 10 on which it is mounted. Since the second flange 18 has an extent circumferentially around the opening in the supporting member of substantially less than 180°, the element 26 may be inserted in place or removed quite readily.

In order to retain the element 26 in place, a suitable latch plate 28 is provided which engages the same face of element 26 as does the flange 18. The latch plate is secured to the member 10 by means of a screw 30 at a location 180° around the opening from the middle of the flange 18. Preferably, the latch plate 28 has a thickness no greater than the thickness of member 10. Obviously, by turning screw 30 to loosen it, the latch plate 28 may be turned to a position where it no longer engages the element 26, thereby enabling the latter to be removed.

Although the element 26 in the embodiment shown in FIGURES 1 and 2 has a thickness substantially equal to that of the member 10, it is also applicable to the mounting of elements having a substantially greater thickness. Thus, if the thickness of element 26 should be greater than that shown in FIGURES 1 and 2, the flange 14 may be offset from the member 10 to accommodate this greater thickness while maintaining the face of the element substantially co-planar with the front or forward surface of the member 10.

Figure 5:
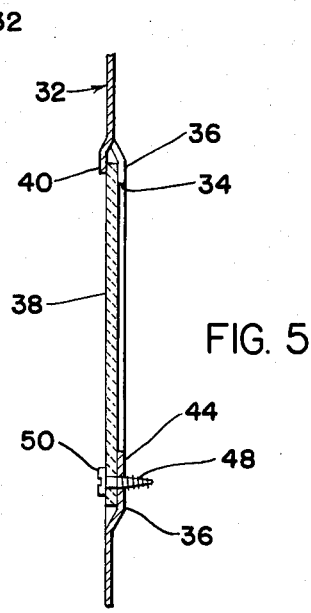
FIGURE 5 is a cross-sectional view taken along line V—V of FIGURE 4.

Referring now to FIGURES 4 and 5, the embodiment of the invention shown again includes a supporting member 32 of sheet metal or the like, but in this case the sheet metal is bent into a right-angled corner having a generally rectangular opening 34 provided therein. As is best shown in FIGURE 5, the member 32 is offset to the right around the major portion of the periphery of opening 34 to present a flange 36 for the reception of a right-angled lens or access cover 38. The upper edge of opening 34 is deformed as shown to provide a pair of flanges 40 and 42 on either face of the right-angled member 32. As was the case with the embodiment shown in FIGURES 1–3, the flanges 40 and 42 are offset to the side of member 10 opposite the flange 36, it being understood that the flanges 40 and 42 are formed in the same manner as flange 18 in the embodiment of FIGURES 1–3 and that the flange 34 terminates at the edges of flanges 40 and 42. With this arrangement, the lens or access cover 38 may be inserted in place between the flanges 40 and 42 on one side of member 32 and the flange 34 on the other side. In order to retain the member 38 in place, the flange 36 is provided with a pair of tabs 44 and 46, each of which is provided with a hole 48 into which a sheet metal screw 50 or the like may be threaded. As will be understood, openings are provided in the lens or access cover 38 which are aligned with the holes 48 whereby the sheet metal screws may pass through the aligned openings to secure the member 38 against the flange 36. To remove the member 38 from the supporting member 32, the screws 50 will be simply removed and the member 38 slipped from under the flanges 40 and 42.

Figure 6:
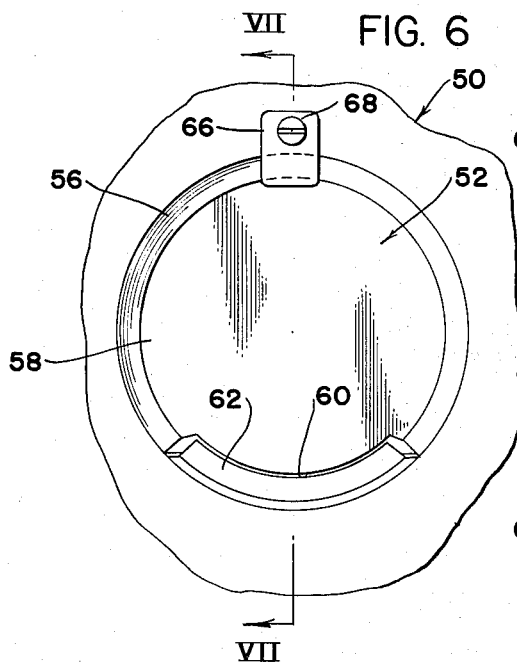
FIGURE 6 is an illustration of an embodiment of the invention particularly adapted for use in mounting reflectors and the like and incorporating a metal backup plate for the reflector which is an integral part of the member on which the reflector is mounted.
Figure 7:
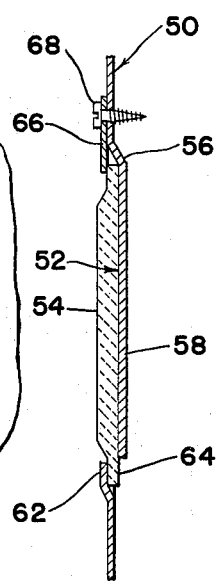
FIGURE 7 is a cross-sectional view taken along line VII—VII of FIGURE 6.

Referring now to FIGURES 6 and 7, it will be noted that in FIGURE 6 the supporting member 50 comprises a sheet metal article which is deformed in a punching or forming operation to provide a cup-shaped recess 52 for the reception of a reflector 54, it being understood that the reflector is shown only in FIGURE 7. As shown in FIGURE 7, the cup-shaped recess 52 comprises a flanged portion 56 extending around its periphery together with and integral backup plate 58 against which the reflector 54 abuts. The lower portion of the flange 56 is punched or sheared along an arcuate edge 60 to provide a second flange 62. With this arrangement, a flange 64 on the reflector 54 may be inserted into the space between flange 62 and backup plate 58, with the reflector being held in place by a latch plate 66 which is secured in place by means of a sheet metal screw 68 as was the case with the embodiment of the invention shown in FIGURES 4 and 5. The arrangement shown in FIGURES 6 and 7 is, of course, particularly adaptable to the mounting or reflectors since the shiny surface of the backup plate will increase the reflectivity of the reflector proper.

The embodiment of the invention shown in FIGURES 8 and 9 is similar to that shown in FIGURES 1–3 and includes a mounting member 70 of sheet metal or the like having a circular opening 72 therein. The material of member 70 is offset to the right as shown in FIGURE 9 to present a first flange 74 which extends around the major portion of the periphery of opening 72. A second flange 76 is offset from the member 70 to the left as shown in FIGURE 9 to complete the flange arrangement around the edge of opening 72. In this case, however, a lamp assembly 78 or the like is secured within the opening 72 and is provided with a radial flange 80 which abuts the respective flanges 74 and 76. A latch plate 82 and sheet metal screw 84 complete the assembly. It is apparent from the embodiment of FIGURES 8 and 9 that the thickness of the component mounted on the supporting member can vary within a wide range. Although the front face of the assembly 78 is substantially co-planar with the forward surface of the mounting member 70, it may be made to project beyond the member 70 by varying the position of flange 80 on the lamp assembly 78. In addition, the flange 74 may be offset with respect to the surface of member 70 to a much greater extent than shown. Such a flange may be formed, for example, by a deep-drawing operation and would engage the back surface of the lamp assembly or other component 78 rather than a flange around its periphery.

In the embodiment of the invention shown in FIGURES 10 and 11, the component 86 may be a lens or access cover and is triangular in shape. As in the other embodiments of the invention, it is mounted on a sheet metal supporting member 88 having a triangular opening 90 therein with this opening having a flange 92 offset around the periphery of the opening except for a small portion at its lower apex. This lower apex of the triangle is formed into a second flange 94 whereby the triangular lens or access cover 86 may be inserted between the flanges 92 and 94 and held in place by sheet metal screws 96. It is thus apparent that the triangular configuration readily adapts itself to an assembly of this sort since one of its corners may be formed into a tab as at 98 which serves as a convenient means for retaining the element 86 between the two flanges.

Although the invention has been shown in connection with certain specific embodiments, it will be readily apparent to those skilled in the art that various departures in form and arrangement of parts may be made to suit requirements without departing from the spirit and scope of the invention. In this respect, it will be apparent that the supporting member for the assembly need not be sheet metal as shown in the embodiments illustrated herein, but may be cast, forged or formed in any other manner, the important thing being that two flanges on either side of the supporting member, and integral therewith, are provided around at least a portion of the opening provided for the component whereby the component may be readily inserted into the opening or removed while requiring a minimum number of parts. In addition, although the mounted components shown herein have planar surfaces, it is apparent that these surfaces could be convex, concave or any other shape to suit requirements.

Having thus described my invention, I claim:

An access opening and removable closure construction comprising a member having an opening therein, a closure element for said opening, a first flange integral with said member and offset to one side of said member by an amount equal to the thickness of the closure element, said first flange bordering said opening and extending parallel to the member more than half-way around the opening, a second flange integral with the member and offset to the opposite side of the member by an amount equal to the thickness of the member, said second flange bordering a remaining portion of the opening and extending parallel to the member substantially less than half-way around the opening, said closure element being larger than said opening and smaller than the space bordered by the connections of said flanges to the member with the closure element being received between said flanges and extending across said opening, and releasable clamping means engaging said closure element at the same side thereof as said second flange, said releasable clamping means being located in spaced peripherally opposite relationship to said second flange and directly opposite a portion of the first flange for holding said closure element snugly against the first flange.

References Cited by the Examiner

UNITED STATES PATENTS

| | | | |
|---|---|---|---|
| 1,111,016 | 9/14 | Fohman | 189—46 |
| 1,226,776 | 5/17 | Kramer | 189—69 |
| 1,474,174 | 11/23 | Segall | 40—158 |
| 1,631,038 | 5/27 | Hodny et al. | 88—96 |
| 1,827,494 | 10/31 | Thomson | 160—369 |
| 1,881,576 | 10/32 | Hess | 88—100 |
| 1,961,584 | 6/34 | Hathorn | 20—40 |
| 1,980,864 | 11/34 | Johnson | 189—64 |
| 2,087,531 | 7/37 | Sands | 88—77 |
| 2,227,655 | 1/41 | Levy | 240—78 |
| 2,253,346 | 8/41 | Patton | 88—78 |
| 2,383,584 | 8/45 | Beishline et al. | 29—545 |
| 2,407,086 | 9/46 | Ledwinka et al. | 189—64 |
| 2,469,210 | 5/49 | Schwab | 248—28 |
| 2,477,942 | 8/49 | Renton | 189—64 |
| 2,738,574 | 3/56 | Riggs | 29—545 |
| 3,000,123 | 9/61 | Hicks | 40—63 |

HARRISON R. MOSELEY, *Primary Examiner.*

EMIL G. ANDERSON, FREDERICK M. STRADER, *Examiners.*